United States Patent
Aitharaju et al.

(10) Patent No.: US 11,642,819 B2
(45) Date of Patent: May 9, 2023

(54) COMPOSITE COMPONENTS AND METHODS OF MANUFACTURING COMPOSITE COMPONENTS USING MAGNETIC FORCES AT FIBER PREFORM SEAMS

(71) Applicant: GM GLOBAL TECHNOLOGY OPERATIONS LLC, Detroit, MI (US)

(72) Inventors: Venkateshwar R. Aitharaju, Troy, MI (US); William R. Rodgers, Bloomfield Township, MI (US); Selina X. Zhao, Rochester Hills, MI (US); Terrence Wathen, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 16/773,516

(22) Filed: Jan. 27, 2020

(65) Prior Publication Data
US 2021/0229327 A1     Jul. 29, 2021

(51) Int. Cl.
*B29C 33/16* (2006.01)
*B29C 45/14* (2006.01)
(Continued)

(52) U.S. Cl.
CPC ...... *B29C 45/14065* (2013.01); *B29C 31/008* (2013.01); *B29C 33/16* (2013.01);
(Continued)

(58) Field of Classification Search
CPC ... B29C 33/16; B29C 33/32; B29C 45/12045; B29C 45/14065; B29C 45/13
See application file for complete search history.

(56) References Cited

U.S. PATENT DOCUMENTS 3,847,558 A    11/1974  Trabocco et al.
4,047,496 A     9/1977  McNeilly et al.
(Continued)

FOREIGN PATENT DOCUMENTS

CN      101544212 A     9/2009
CN        1951664 B     4/2011
(Continued)

OTHER PUBLICATIONS

First Office Action for German Application No. 102020134447.3 dated Oct. 22, 2021 with correspondence dated Nov. 11, 2021 from Manitz Finsterwald Patent—und summarizing content, 6 pages.
(Continued)

*Primary Examiner* — Alison L Hindenlang
*Assistant Examiner* — Debjani Roy
(74) *Attorney, Agent, or Firm* — Harness, Dickey & Pierce, P.L.C.

(57) ABSTRACT

A method of manufacturing a composite component according to various aspects of the present disclosure includes disposing a fiber preform in a mold. The fiber preform includes a first portion having a first edge and a second portion having a second edge. The first edge and the second edge cooperate to at least partially define a gap. One of the first portion or the second portion includes a first ferromagnetic material and the other of the first portion or the second portion includes a first magnetic or magnetizable component. The method further includes closing the gap by generating a magnetic field from the first magnetic or magnetizable component. The method further includes injecting a polymer precursor into the mold. The method further includes forming the composite component by solidifying the polymer precursor to form a polymer. The composite component includes the fiber preform and the polymer.

19 Claims, 8 Drawing Sheets

(51) Int. Cl.
 *B29C 31/00* (2006.01)
 *B29C 33/32* (2006.01)
 *H01F 1/04* (2006.01)

(52) U.S. Cl.
 CPC ........ *B29C 33/32* (2013.01); *B29C 45/14008* (2013.01); *H01F 1/04* (2013.01); *B29C 2045/14131* (2013.01)

(56) References Cited

U.S. PATENT DOCUMENTS

| | | | |
|---|---|---|---|
| 5,833,795 A | 11/1998 | Smith et al. | |
| 5,863,024 A * | 1/1999 | Blind | H01F 7/08 251/129.01 |
| 5,863,204 A * | 1/1999 | Fulton | G09B 1/34 434/167 |
| 6,358,029 B1 * | 3/2002 | Niimi | B28B 7/346 425/DIG. 115 |
| 7,819,462 B1 | 10/2010 | Owens | |
| 7,927,077 B2 | 4/2011 | Olson | |
| 8,033,592 B2 | 10/2011 | Hsu et al. | |
| 2004/0129924 A1 | 7/2004 | Stark | |
| 2006/0106147 A1 | 5/2006 | Fasulo et al. | |
| 2006/0199890 A1 | 9/2006 | Fasulo et al. | |
| 2007/0299185 A1 | 12/2007 | Ottaviani et al. | |
| 2008/0044680 A1 * | 2/2008 | Thibodeau | B29C 45/0013 425/130 |
| 2008/0079195 A1 * | 4/2008 | Chan | B29C 45/14065 264/271.1 |
| 2008/0128078 A1 | 6/2008 | May et al. | |
| 2009/0047854 A1 | 2/2009 | Bleeker et al. | |
| 2009/0127253 A1 | 5/2009 | Stark et al. | |
| 2010/0052667 A1 * | 3/2010 | Kohama | G01N 27/9046 324/239 |
| 2010/0098925 A1 | 4/2010 | Fasulo et al. | |
| 2011/0121225 A1 | 5/2011 | Posudievsky et al. | |
| 2015/0328847 A1 | 11/2015 | Kia et al. | |
| 2017/0113703 A1 | 4/2017 | Hoffman | |
| 2017/0313002 A1 | 11/2017 | Huang et al. | |
| 2018/0361690 A1 * | 12/2018 | Huang | B29C 73/30 |

FOREIGN PATENT DOCUMENTS

| | | | |
|---|---|---|---|
| CN | 102056723 A | | 5/2011 |
| CN | 105324434 A | | 2/2016 |
| CN | 107953505 A | | 4/2018 |
| CN | 109109348 A | | 1/2019 |
| CN | 110073732 A | | 7/2019 |
| CN | 113172827 A | | 7/2021 |
| DE | 102006056799 A1 | | 6/2008 |
| DE | 102006056799 A1 | | 6/2008 |
| DE | 102017130341 A1 | | 6/2019 |
| DE | 102017130341 A1 | | 6/2019 |
| DE | 102020134447 A1 | | 7/2021 |
| EP | 1986841 A1 | | 11/2008 |
| EP | 3750660 A1 | | 12/2020 |
| FR | 2886199 A1 | | 12/2006 |
| JP | S6154914 A | | 3/1986 |
| JP | 04247919 | * | 9/1992 |

OTHER PUBLICATIONS

First Office Action for Chinese Application No. 202110110201.7 dated Aug. 3, 2022, with correspondence dated Aug. 10, 2022, from China Patent Agent (H.K.) Ltd. summarizing content, 10 pages.

* cited by examiner

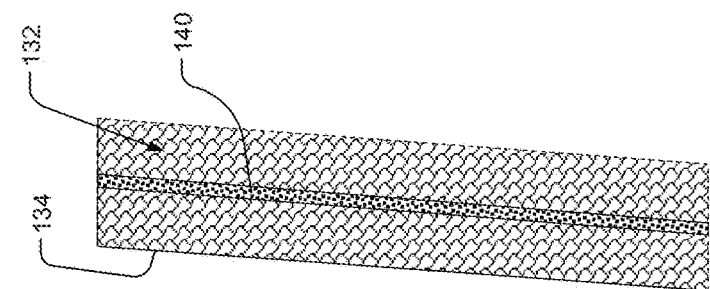
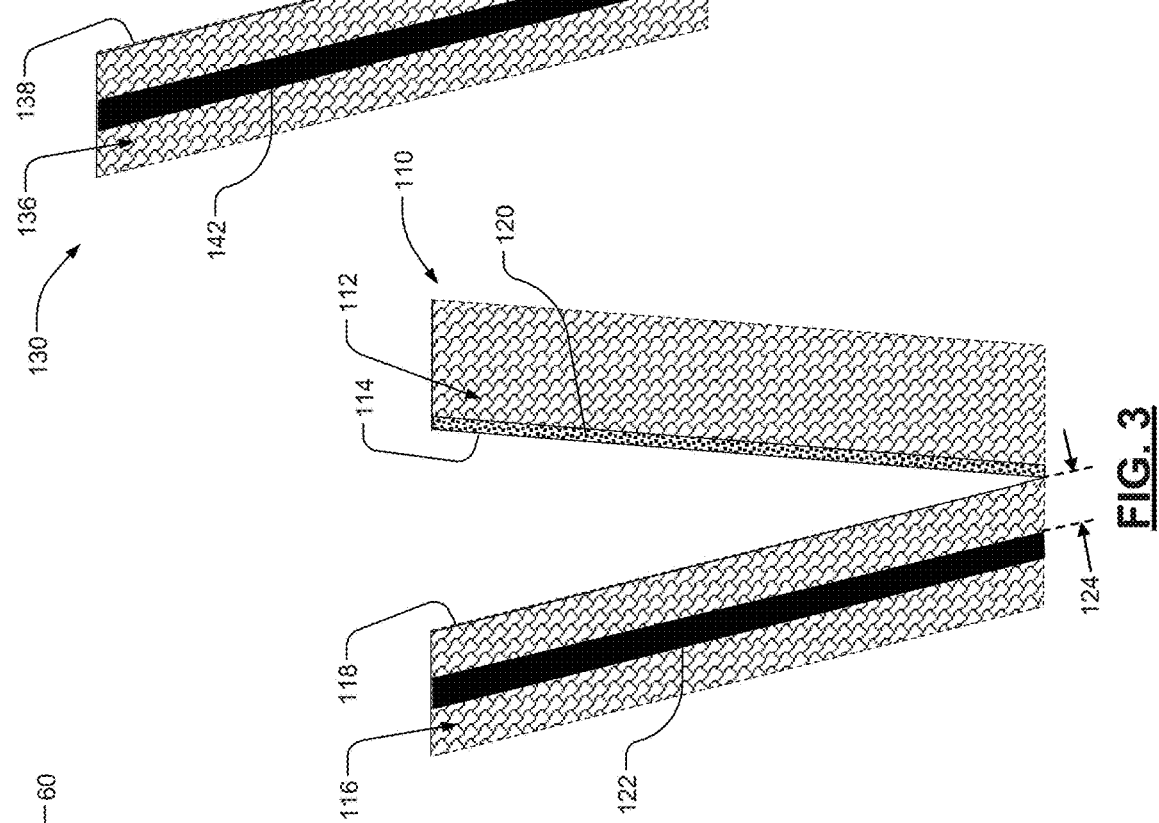
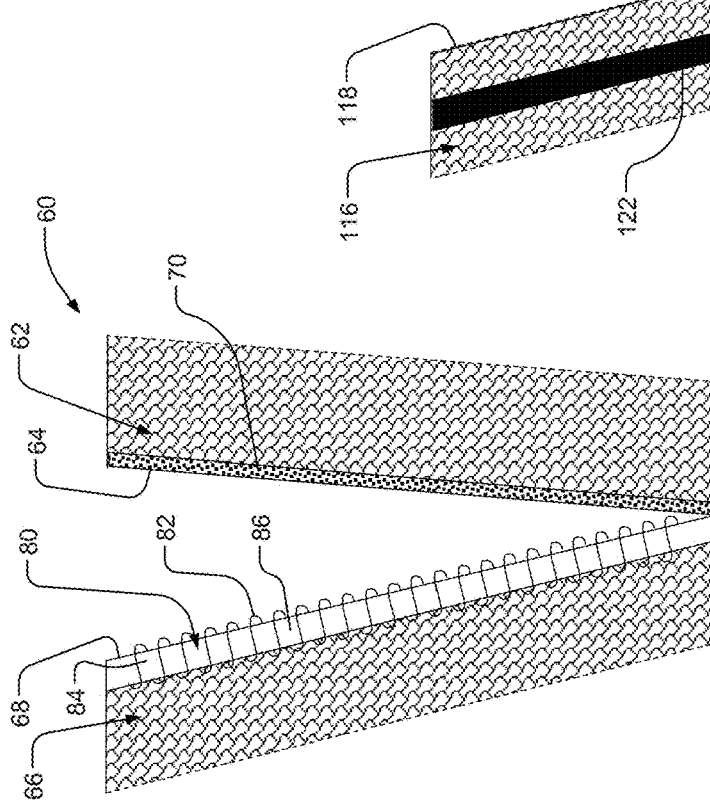

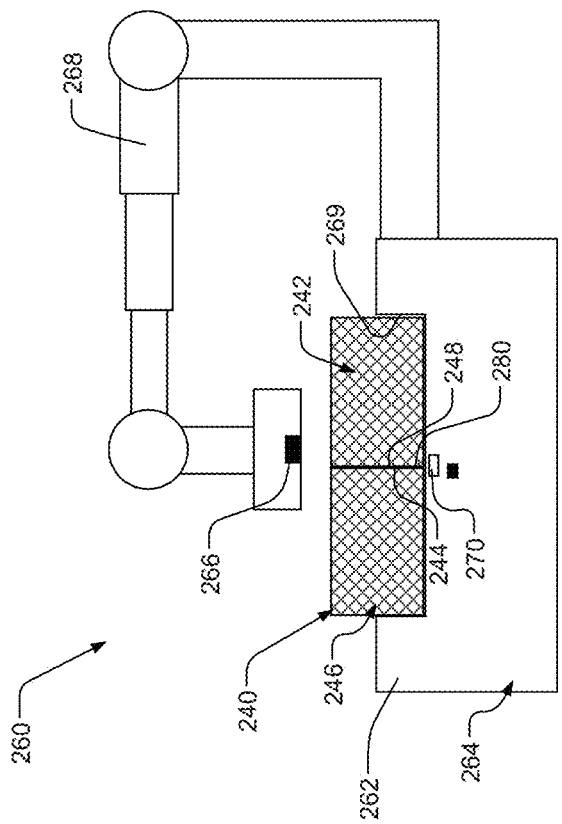
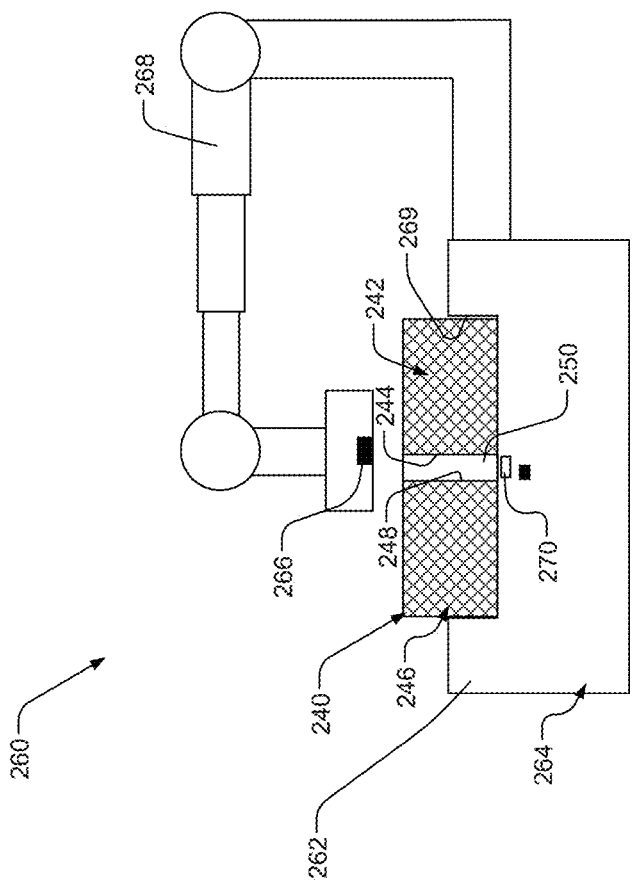

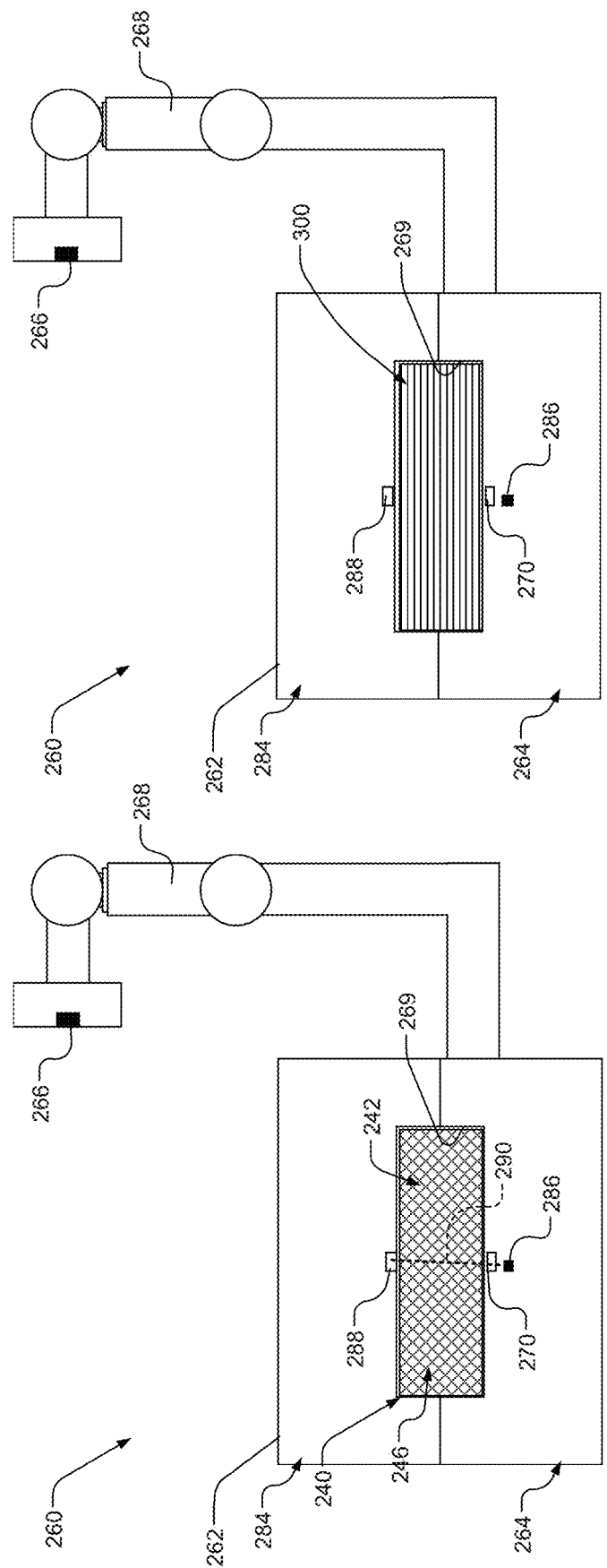

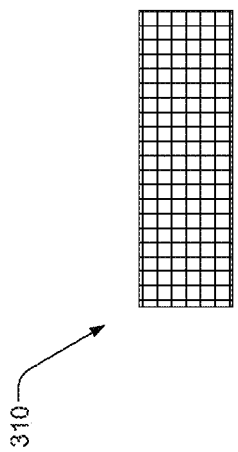
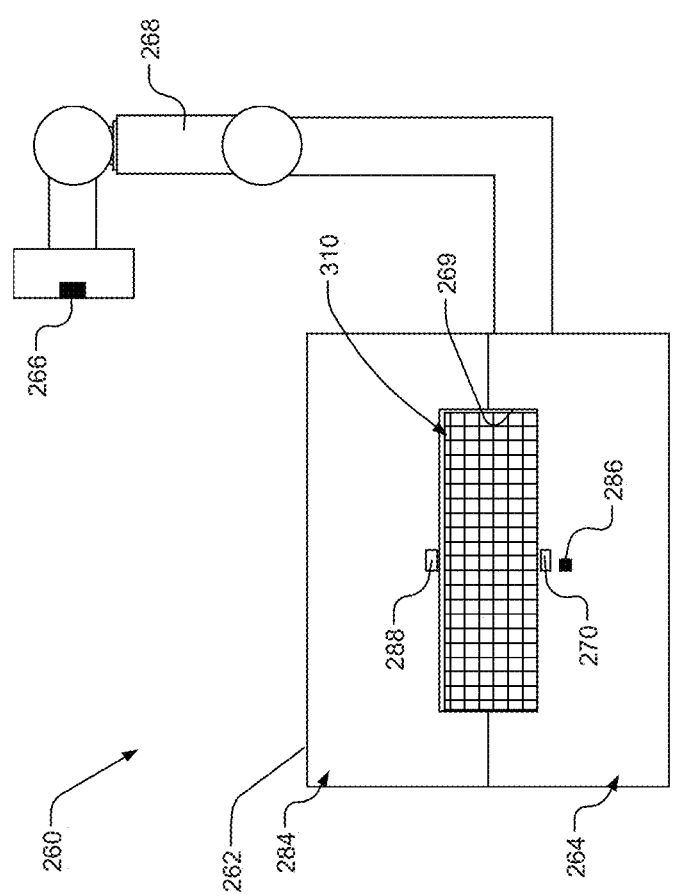

COMPOSITE COMPONENTS AND METHODS OF MANUFACTURING COMPOSITE COMPONENTS USING MAGNETIC FORCES AT FIBER PREFORM SEAMS

GOVERNMENT SUPPORT

This invention was made with government support under DE-EE0006826 awarded by the Department of Energy. The Government has certain rights in the invention.

INTRODUCTION

This section provides background information related to the present disclosure which is not necessarily prior art.

The present disclosure pertains to methods of manufacturing a polymeric composite component by employing a fiber preform in a mold.

It is advantageous that components of automobiles or other vehicles be lightweight to improve fuel efficiency. However, it is also advantageous that such components exhibit adequate strength during use. Polymeric composite components may be desirably lightweight while exhibiting high strength.

SUMMARY

This section provides a general summary of the disclosure, and is not a comprehensive disclosure of its full scope or all of its features.

The present disclosure relates to composite components and methods of manufacturing composite components using magnetic forces at fiber preform seams.

In various aspects, the present disclosure provides a method of manufacturing a composite component. The method includes disposing a fiber preform in a mold. The fiber preform includes a first portion having a first edge and a second portion having a second edge. The first edge and the second edge cooperate to at least partially define a gap. One of the first portion or the second portion includes a first ferromagnetic material and the other of the first portion or the second portion includes a first magnetic or magnetizable component. The method further includes closing the gap by generating a magnetic field from the first magnetic or magnetizable component. The method further includes injecting a polymer precursor into the mold. The method further includes forming the composite component by solidifying the polymer precursor to form a polymer. The composite component includes the fiber preform and the polymer.

In one aspect, the first magnetic or magnetizable component includes an electromagnetic circuit. The electromagnetic circuit includes an electrically-conductive coil at least partially defining an interior region and a core disposed at least partially within the interior region. The core includes a second ferromagnetic material.

In one aspect, the closing includes supplying current to an inductor to generate a magnetic field from the electromagnetic circuit.

In one aspect, the inductor is coupled to a movable arm.

In one aspect, the method further includes moving the movable arm to a first position prior to the closing. The method further includes moving the movable arm to a second position distinct from the first position after the closing. The movable arm is in the first position during the closing.

In one aspect, the first magnetic or magnetizable component includes a permanent magnet.

In one aspect, the first ferromagnetic material includes iron, nickel, cobalt, or any combination thereof.

In one aspect, the mold includes a second magnetic or magnetizable component.

In one aspect, the method further includes, prior to the closing, aligning the fiber preform in the mold by generating a magnetic field from the second magnetic or magnetizable component.

In one aspect, the method further includes, after the closing, maintaining the gap in a closed position by generating a magnetic field from the second magnetic or magnetizable component.

In one aspect, the first ferromagnetic material is substantially continuous along a first length of the first edge. The first magnetic or magnetizable component is substantially continuous along a second length of the second edge.

In one aspect, the first edge and the second edge are non-linear and define complementary shapes.

In one aspect, the first ferromagnetic material is disposed in a first plurality of regions in the first portion. The first magnetic or magnetizable component is disposed in a second plurality of regions in the second portion. The first plurality of regions is configured to be aligned with the second plurality of regions, respectively, after the closing.

In one aspect, the closing includes forming a butt joint between the first edge and the second edge.

In one aspect, the closing includes forming a lap joint between the first edge and the second edge.

In one aspect, a maximum dimension of the gap is greater than or equal to about 1 mm to less than or equal to about 10 mm.

In one aspect, the method further includes, prior to the injecting, determining whether the gap is closed.

In one aspect, the determining includes detecting a presence of at least one of the first portion of the fiber preform and the second portion of the fiber preform with an optical sensor.

In one aspect, the fiber preform includes a first fiber preform including the first portion and a distinct second fiber preform including the second portion.

In various aspects, the present disclosure provides a method of manufacturing a composite component. The method includes disposing a fiber preform in a mold. The fiber preform includes a first portion including a first edge and a second portion including a second edge. The first edge and the second edge cooperate to at least partially define a gap. One of the first portion or the second portion includes a first ferromagnetic material. The other of the first portion or the second portion includes a first magnetic or magnetizable component. The mold includes a second magnetic or magnetizable component. The method further includes aligning the fiber preform in the mold by generating a magnetic field from the second magnetic or magnetizable component. The method further includes, after the aligning, closing the gap by generating a magnetic field from the first magnetic or magnetizable component. The method further includes, after the closing, maintaining the gap in a closed position by generating a magnetic field from the second magnetic or magnetizable component. The method further includes determining whether the gap is closed. The method further includes, after the determining, injecting a polymer precursor into the mold. The method further includes forming the composite component by solidifying the polymer precursor to form a polymer. The composite component includes the fiber preform and the polymer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C depict a fiber preform according to various aspects of the present disclosure; FIG. 1A is a top view of the fiber preform in a first configuration; FIG. 1B is a top view of first and second portions of the fiber preform in the first configuration; and FIG. 1C is a top view of the fiber preform in a second configuration;

FIG. 2 is a top view of first and second portions of another fiber preform in a first configuration according to various aspects of the present disclosure;

FIG. 3 is a top view of first and second portions of yet another fiber preform according to various aspects of the present disclosure;

FIG. 4 is a top view of first and second portions of yet another fiber preform according to various aspects of the present disclosure;

Figure 6:
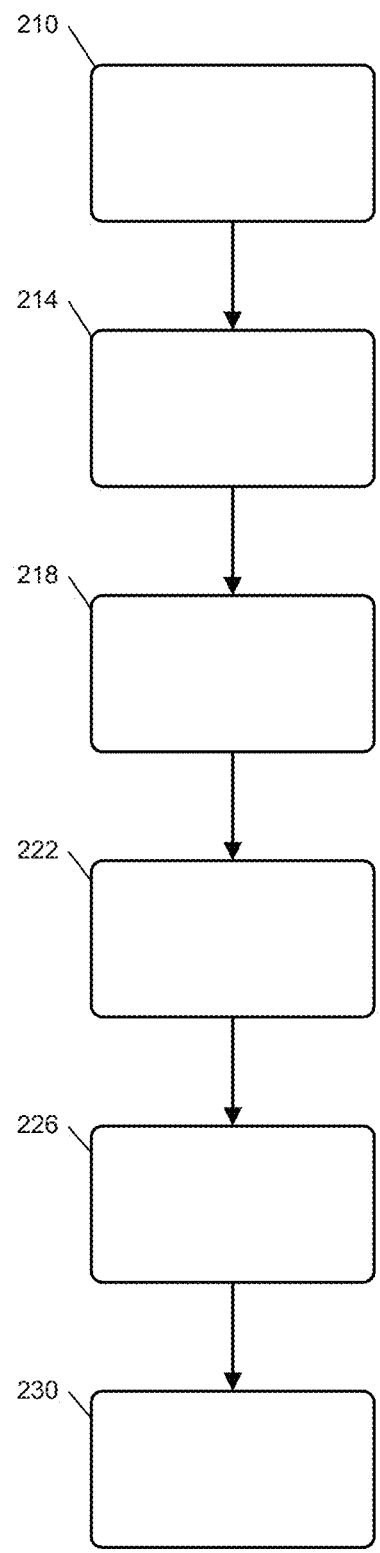
Figure 7B:
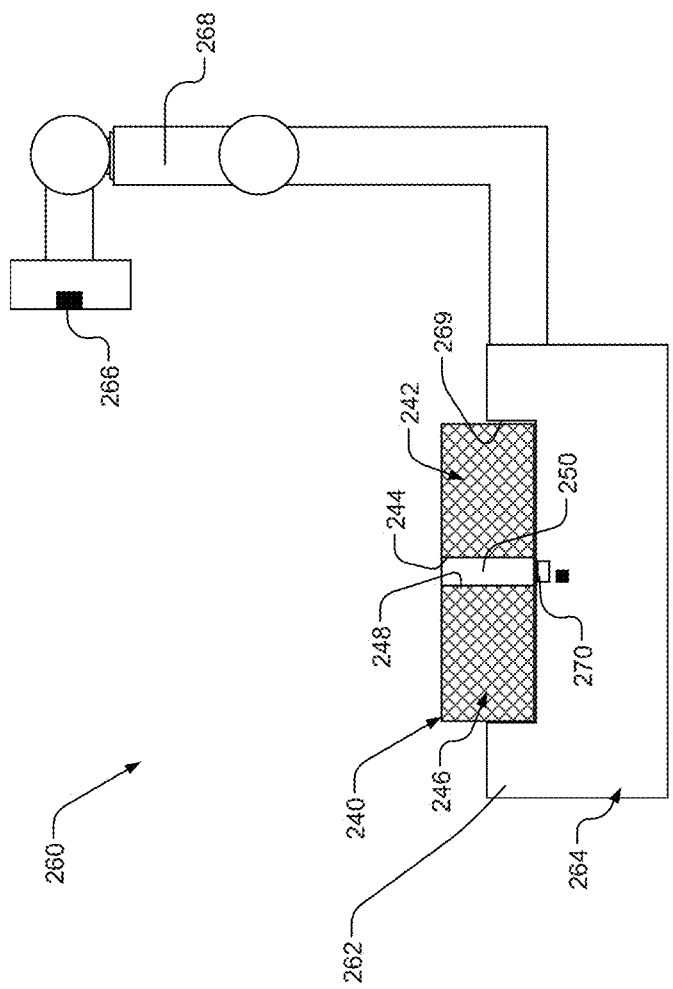
Figure 7A:
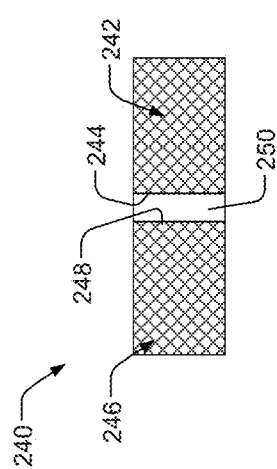

FIG. 6 is a flowchart depicting a method of manufacturing a composite component according to various aspects of the present disclosure; and FIGS. 7A-7H are schematic views depicting an example method of manufacturing a composite component according to various aspects of the present disclosure; FIG. 7A depicts providing a fiber preform; FIG. 7B depicts disposing the fiber preform in a mold; FIG. 7C depicts moving an inductor to a region adjacent to the fiber preform; FIG. 7D depicts closing a gap in the fiber preform to form a seam;

FIG. 7E depicts closing the mold; FIG. 7F depicts injecting a polymer precursor into the mold; FIG. 7G depicts forming the composite component by solidifying the polymer precursor; and FIG. 7H depicts removing the composite component from the mold.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Some methods of manufacturing composite components involve use of a fiber preform, such as a fiber fabric. Components having complex three-dimensional geometries may be fabricated by bringing edges of the fiber preform together (e.g., at a slit) to form the desired shape, and then injecting and solidifying the polymer precursor to form the component. However, it may be difficult to hold the edges of the preform together while injecting the polymer precursor, which may result in resin-rich areas at gaps between preform edges. The resin-rich areas may be relatively weak compared to surrounding areas having fibers. Additionally, the process may be substantially manual and time-consuming.

In various aspects, the present disclosure provides a method of manufacturing a composite component having a complex shape by using a magnetic field to hold edges together during subsequent processing steps. The method includes use of a fiber preform having a gap defined between two portions or edges. One of the portions includes a ferromagnetic material and the other of the portions includes a magnetic or magnetizable component, such as a permanent magnet or a magnetic circuit, respectively. The method further includes closing the gap by generating a magnetic field from the magnetic or magnetizable component to attract the ferromagnetic material and bring the portions together. The method further includes injecting a polymeric precursor into the mold and solidifying the polymeric precursor to form the composite component. The component may have a three-dimensional or non-planar geometry, including contours and/or darts.

Figure 1A:
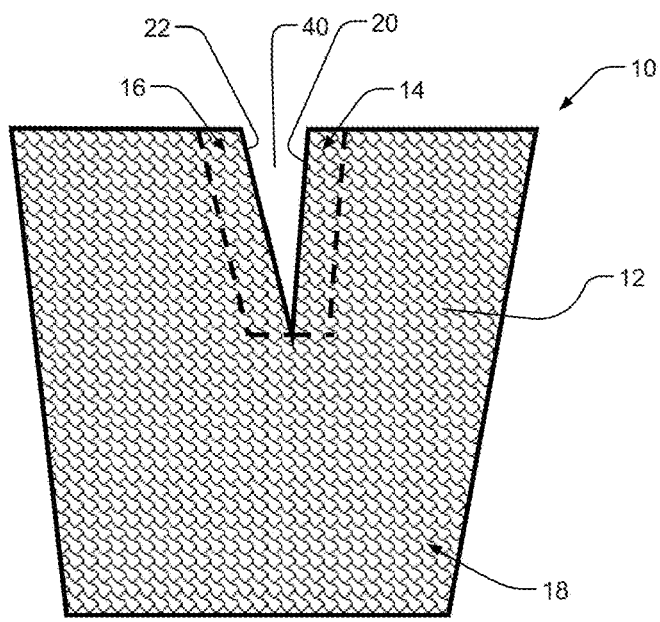
Figure 1B:
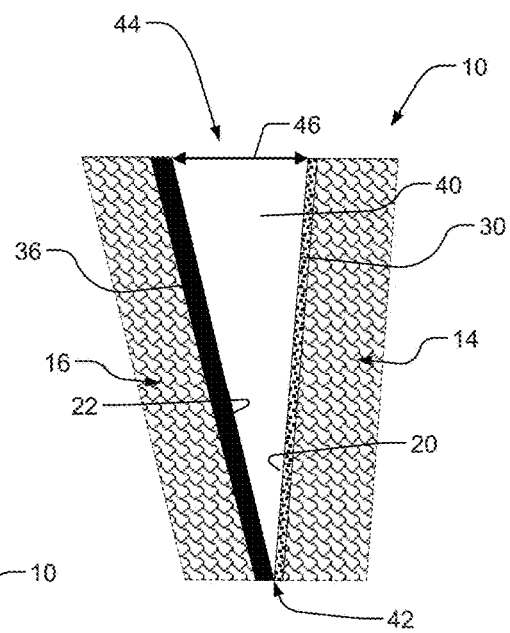
Figure 1C:
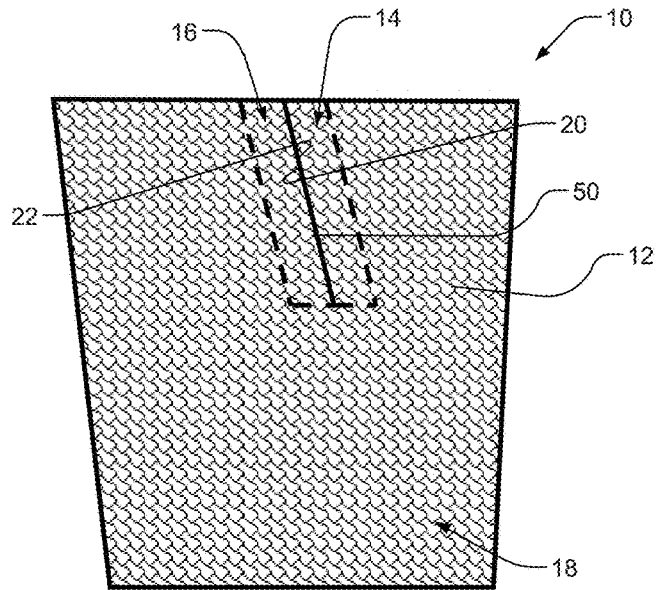

Referring to FIGS. 1A-1C, a fiber preform 10 according to various aspects of the present disclosure is provided. The fiber preform 10 includes a plurality of fibers 12. The fiber preform 10 includes a first joint portion or first portion 14, a second joint portion or second portion 16, and a main portion or third portion 18. Each of the first, second, and third portions 14, 16, 18 includes the fibers 12. The first portion has a first edge 20 and the second portion 16 has a second edge 22.

As best shown in FIG. 1B, the first portion 14 includes a ferromagnetic material 30. The ferromagnetic material 30 may include iron, nickel, cobalt, or combinations thereof. The ferromagnetic material 30 is coupled to a portion of the fibers 12. The ferromagnetic material 30 may be in the form of one or more sheets, wires, or bars embedded within the fiber preform 10 or attached to an exterior surface of the fiber preform 10, for example. In certain aspects, the ferromagnetic material 30 may be in the form of a plurality of particles or a coating on a portion of the fibers 12 in the first portion 14.

The second portion 16 includes a magnetic or magnetizable component 36 capable of generating a magnetic field. When the magnetic or magnetizable component 36 includes a magnetic component, the magnetic field is inherent. The magnetic component may include a permanent magnet, as shown in FIG. 1B. An example of a magnetizable component is described below in the discussion accompanying FIG. 2. The magnetic or magnetizable component 36 is coupled to the fibers 12. For example, the magnetic or magnetizable component 36 may be embedded in the fiber preform 10 or attached to an exterior surface of the fiber preform 10.

The fiber preform 10 may be movable between a first or open configuration, as shown in FIGS. 1A-1B, and a second or closed configuration, as shown in FIG. 1C. In the first configuration, the first edge 20 and the second edge 22 at least partially define a gap or slit 40. In certain variations, the first and second edges 20, 22 may meet at a proximal end 42 of the gap 40, as shown in FIGS. 1A-1B. The first and second edges 20, 22 may be separated at a distal end 44 of the gap 40. In various alternative variations, the first edge 20 and the second edge 22 may be spaced apart from one another across the entire gap 40.

In certain aspects, the gap 40 may define a maximum dimension 46 at the distal end 44. The maximum dimension 46 is a maximum distance between the first edge 20 and the second edge 22. When the first and second edges 20, 22 are spaced apart from one another along the entire gap 40, the maximum dimension 46 may be perpendicular to one or both of the first and second edges 20, 22. In certain aspects, the maximum dimension 46 may be greater than or equal to about 1 mm to less than or equal to about 10 mm, optionally greater than or equal to about 2 mm to less than or equal to about 6 mm, or optionally greater than or equal to about 3 mm to less than or equal to about 4 mm.

In certain aspects, the ferromagnetic material 30 may extend substantially continuously along a length of the first portion 14, such as between the proximal end 42 and the distal end 44. The magnetic or magnetizable component 36 may extend substantially continuously along a length of the second portion 16, such as between the proximal end 42 and the distal end 44. However, in various alternative aspects, the ferromagnetic material 30 and/or the magnetic or magnetizable component 36 may include a discrete plurality of ferromagnetic elements, as described in the discussion accompanying FIG. 5.

Referring to FIG. 1C, in the second configuration, the first edge 20 and the second edge 22 are coupled to one another at a seam 50, thereby closing the gap 40 (FIGS. 1A-1B). In the closed configuration, the fiber preform 10 may have a three-dimensional or non-planar shape, which may include contours and/or darts. The ferromagnetic material 30 may be substantially aligned with the first edge 20. The magnetic or magnetizable component 36 may be substantially aligned with the second edge 22. Accordingly the seam 50 may be a butt joint.

The first edge 20 is attracted to the second edge 22 by a magnetic field emitted by the magnetic or magnetizable component 36. The first and second portions 14, 16 may be in direct contact. In certain aspects, the first and second edges 20, 22 may be substantially the same length. A location of the seam 50 may be optimized to be in a non-critical location depending on the particular use of the component to be formed from the fiber preform 10. For example, the seam 50 may be disposed in a location that is not expected to be subjected to high stresses.

The fibers 12 may include carbon fibers, glass fibers (e.g., fiber glass, quartz), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), natural fibers (e.g., cotton, flax, cellulose, spider silk), or any combination thereof, by way of example. The fibers may be fabricated as woven fabric, continuous random fabric, continuous strand unidirectional plies, oriented combed discontinuous long fiber fabric, oriented braided fabric, a chopped random mat with Z-directional stitches, or any combinations thereof. When the fibers 12 are electrically conductive, such as when the fibers 12 include carbon fibers, the magnetic or magnetizable component 36 (FIG. 1B) may be electrically isolated from the fibers 12, such as by a glass veil or barrier (not shown).

Referring to FIG. 2, a portion of another fiber preform 60 according to various aspects of the present disclosure is provided. The fiber preform 60 includes a first portion 62 having a first edge 64 and a second portion 66 having a second edge 68. The first portion 62 includes a first ferromagnetic material 70. Unless otherwise described, the fiber preform 60 may be similar to the fiber preform 10 of FIGS. 1A-1C.

The second portion 66 includes a magnetizable component, which may be an electromagnetic circuit 80. The electromagnetic circuit 80 is capable of generating a magnetic field, as described in greater detail below (see discussion accompanying FIGS. 7C-7D). In some examples, the electromagnetic circuit 80 includes an electrically-conductive coil 82 at least partially defining an interior region 84 into which a core 86 is disposed. The core 86 includes a second ferromagnetic material. The second ferromagnetic material may be the same as the first ferromagnetic material 70 or different from the first ferromagnetic material 70. As described above, the electromagnetic circuit 80 may be electrically isolated, such as by a glass veil or barrier, when fibers of the fiber preform 60 are electrically conductive.

First and second portions of a fiber preform may be configured to form a butt joint, as shown in FIGS. 1A-2. However, other joints are also contemplated within the scope of the present disclosure. With reference to FIG. 3, a portion of yet another fiber preform 110 according to various aspects of the present disclosure is provided. The fiber preform 110 includes a first portion 112 having a first edge 114 and a second portion 116 having a second edge 118. Unless otherwise described, the fiber preform 110 may be similar to the fiber preform 10 of FIGS. 1A-1C.

The first portion 112 includes a ferromagnetic material 120. The second portion 116 includes a magnetic or magnetizable component 122. The ferromagnetic material 120 may be substantially aligned with the first edge 114. The magnetic or magnetizable component 122 may be offset from the second edge 118. In certain aspects, an offset 124 between the second edge 118 and the magnetic or magnetizable component 122 may be greater than or equal to about 1 mm to less than or equal to about 15 mm, optionally greater than or equal to about 3 mm to less than or equal to about 10 mm, or greater than or equal to about 5 mm to less than or equal to about 6 mm. Accordingly, in a closed configuration, the first and second portions 112, 116 are configured to form a lap joint. In various alternative aspects, the ferromagnetic material 120 may be offset from the first edge 114 and the magnetic or magnetizable component 122 may be substantially aligned with the second edge 118.

Referring to FIG. 4, a portion of yet another fiber preform 130 according to various aspects of the present disclosure is provided. The fiber preform 130 includes a first portion 132 having a first edge 134 and a second portion 136 having a second edge 138. Unless otherwise described, the fiber preform 130 may be similar to the fiber preform 10 of FIGS. 1A-1C.

The first portion 132 includes a ferromagnetic material 140. The second portion 136 includes a magnetic or magnetizable component 142. The ferromagnetic material 140 is offset from the first edge 134. The magnetic or magnetizable component 142 is offset from the second edge 138. The offsets may be similar to the offset 124 of FIG. 3. Accordingly, in a closed configuration, the first and second portions 132, 136 are configured to form a lap joint.

Figure 5:
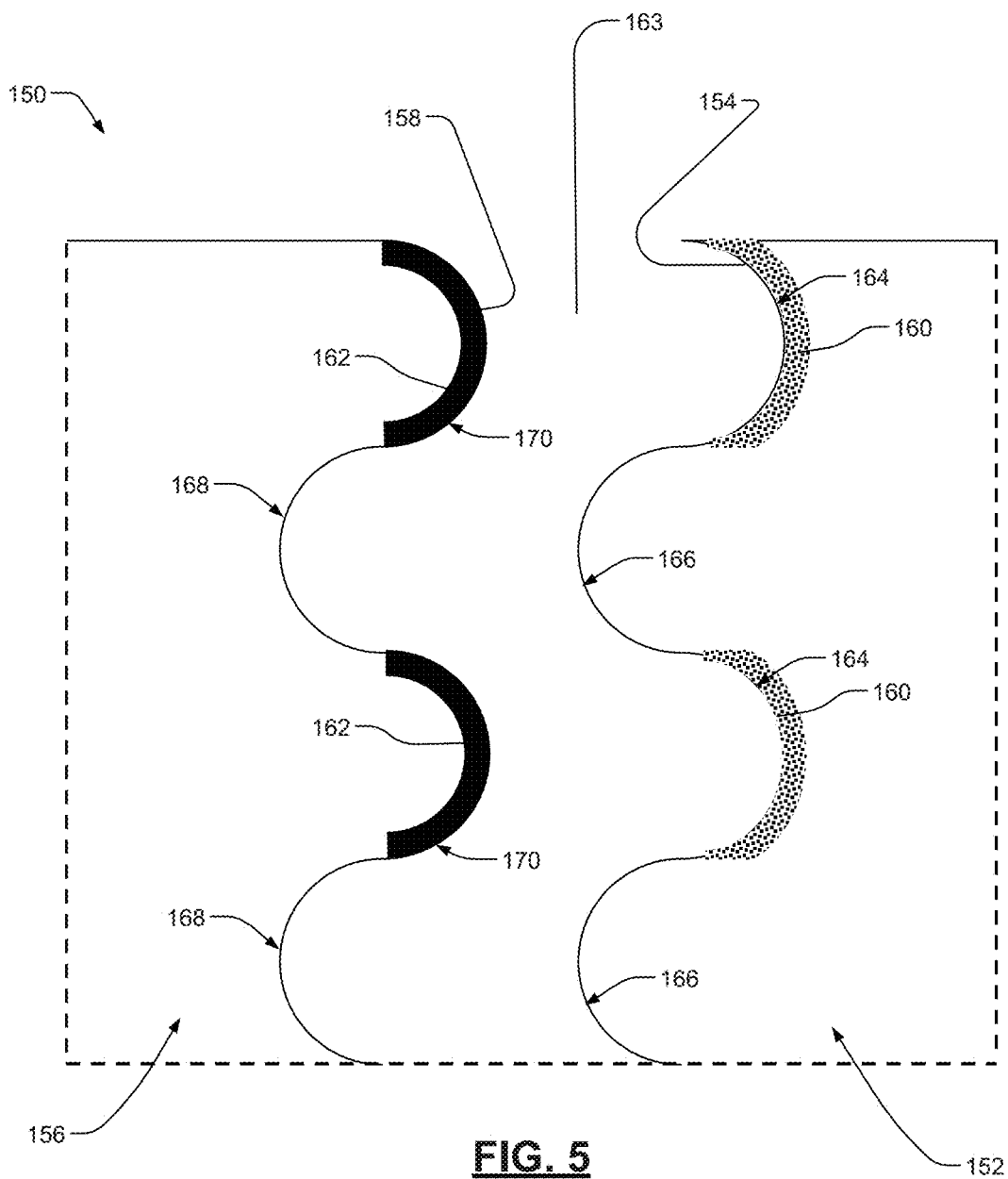
FIG. 5 is a partial top view of yet another fiber preform according to various aspects of the present disclosure.

Referring to FIG. 5, a portion of yet another fiber preform 150 according to various aspects of the present disclosure is provided. The fiber preform 150 includes a first portion 152 having a first edge 154 and a second portion 156 having a second edge 158. The first portion 152 includes a plurality of ferromagnetic elements 160. The second portion 156 includes a plurality of magnetic or magnetizable components 162.

In an open configuration, as shown in FIG. 5, the first and second edges 154, 158 are spaced apart to define a gap 163. In certain aspects, the first and second edges 154, 158 may be non-linear. The first and second edges 154, 158 may define complementary shapes.

For example, the first edge 154 may include a first plurality of concave regions 164 and a first plurality of convex regions 166. The first concave and convex regions 164, 166 may be alternatingly disposed. The plurality of ferromagnetic elements 160 may be disposed along the plurality of concave regions 164, respectively. The second edge 158 may include a second plurality of concave regions 168 and a second plurality of convex regions 170. The second concave and convex regions 168, 170 may be alternatingly disposed. The plurality of magnetic or magnetizable elements 162 may be disposed along the second plurality of convex regions 170, respectively.

When the fiber preform 150 is in a closed configuration, the first plurality of concave regions 164 aligns with the second plurality of convex regions 170. The first plurality of convex regions 166 aligns with the second plurality of concave regions 168. The regions 164, 166, 168, 170 may facilitate proper alignment of the first and second portions 152, 156 when the fiber preform 150 is moved from an open configuration to the closed configuration, particularly in the case of the pluralities of discrete ferromagnetic elements 160 and discrete magnetic or magnetizable components 162.

Referring to FIG. 6, a method of manufacturing a composite component including a composite preform according to various aspects of the present disclosure is provided. The method of manufacturing may be substantially automated.

The method generally includes providing a fiber preform at 210 (see FIG. 7A and accompanying discussion), disposing the fiber preform in a mold at 214 (see FIG. 7B and accompanying discussion), closing a gap in the preform at 218 (see FIGS. 7C-7D and accompanying discussion), closing the mold at 222 (see FIG. 7E and accompanying discussion), injecting and solidifying a polymer precursor to form a composite component at 226 (see FIGS. 7F-7G and accompanying discussion), and removing the composite component from the mold at 230 (see FIG. 7H and accompanying discussion).

In certain aspects, the method may include resin transfer molding (RTM), such as high-pressure resin transfer molding (HP-RTM), compression resin transfer molding (C-RTM), or vacuum assisted resin transfer molding (VARTM); compression molding, such as direct long fiber thermoplastic (DLFT) compression molding; or injection molding. When thermoset compression molding is used, the ferromagnetic material (e.g., in powder or wire form) may be added into a thermoset prepreg material, for example, prior to molding. When thermoplastic compression molding is used, the ferromagnetic materials may be added to a fiber preform prior to molding. When injection molding is used, the ferromagnetic material may be added to the fiber preform prior to molding. Alternative, a two-step injection molding method may be employed. In the two-step process, the ferromagnetic material in a powdered form may be injected into the fiber preform at the appropriate location in a first operation. The fiber preform may then be moved to an injection molding station where the gap is closed and polymeric material injected in a second operation.

With reference to FIG. 7A, the method includes providing a fiber preform 240. The fiber preform 240 includes a first portion 242 having a first edge 244 and a second portion 246 having a second edge 248. The first and second edges 244, 248 are spaced apart to define a gap or slit 250. One of the first portion and the second portion 242, 246 includes a ferromagnetic material (not shown) and the other of the first portion and the second portion 242, 246 includes a first magnetic or magnetizable component (not shown). In certain aspects, the fiber preform 240 may be similar to any of the fiber preforms 10, 60, 110, 130, 150 described above. In various alternative aspects, a fiber preform may include a plurality of fiber preforms, such as a first fiber preform including a first portion and a second fiber preform including a second portion. The first and second portions may be coupled to join the first and second fiber preforms.

Providing the fiber preform 240 may optionally include forming the fiber preform 240. In certain aspects, the fiber preform 240 may be formed by known techniques, such as tailored fiber placement (TFP). In another example, the fiber preform 240 may be formed by separating a portion of fabricated (e.g., woven) fibers from a roll.

Forming the fiber preform 240 may include forming the slit 250. In one example, such as when TFP is used to form the fiber preform 240, the slit 250 may be formed concurrently with fiber placement (e.g., by selective placement of fibers to avoid a region of the slit 240). In another example, such when the fiber preform 240 is separated from a larger roll of fabricated fibers, the slit may be cut into the fibers. Slit locations, shapes, and sizes may be determined based on a desired three-dimensional shape of the composite component to be formed (e.g., by fabric draping analysis).

Forming the fiber preform 240 may include coupling the ferromagnetic material and the magnetic or magnetizable material to the fibers. The ferromagnetic material and the first magnetic or magnetizable component may be placed within (i.e., embedded) or on the fiber preform 240 using automation. When the fibers of the preform include an electrically-conductive material, the method may further include isolating the first magnetic or magnetizable component from the fibers, such as by a glass barrier or veil. For example, automation may be used to place a first glass veil, then the magnetic or magnetizable component, and then a second glass veil. The ferromagnetic component, the first magnetic or magnetizable component, and optionally the glass barrier may be coupled to the fibers by stitching. In certain alternative variations, the ferromagnetic material may be applied to a portion of the fibers as a coating that bonds with the fiber interface.

Referring to FIG. 7B, a portion of a system 260 according to various aspects of the present disclosure is provided. The system 260 includes a mold 262 including a first or bottom portion 264. The mold may be formed from a non-magnetic and non-magnetizable material. For example, the mold 262 may include aluminum or a composite material. The system 260 further includes an inductor 266. In certain aspects, the inductor 266 is coupled to a movable arm 268. Although the movable arm 268 is shown is being coupled to the mold 262, it may alternatively be separate from the mold 262.

The method includes disposing the fiber preform 240 in the mold 262. More particularly, the method may include disposing the fiber preform 240 in a cavity 269 of the bottom mold portion 264. For example, the fiber preform 240 may be draped in the cavity 269 of bottom mold portion 264.

Disposing the fiber preform 240 in the mold 262 may optionally include aligning the fiber preform 240 in the cavity 269. In certain aspects, the bottom mold portion 264 may include a second magnetic or magnetizable component 270, such as a permanent magnet or an electromagnetic circuit. The second magnetic or magnetizable component 270 may be configured to emit a magnetic field (i.e., an inherent magnetic field or a generated magnetic field). The ferromagnetic material of the fiber preform 240 is pulled toward the magnetic field to align the fiber preform 240 in the mold 262. When the second magnetic or magnetizable component 270 is a permanent magnet, the magnetic field facilitates alignment throughout the manufacturing process. When the second magnetic or magnetizable component 270 is a magnetic circuit, it may generate the magnetic field for all or a portion of the manufacturing process. In some examples, the magnetic field is temporarily generated to facilitate initial alignment of the fiber precursor in the cavity 269.

With reference to FIGS. 7C-7D, the method includes closing the gap 250 to form a seam 280. Closing the gap 250 includes moving the fiber preform 240 from a first or open configuration (FIG. 7C) to a second or closed configuration (FIG. 7D). In certain aspects, the first magnetic or magnetizable component includes a magnetizable component, such as an electromagnetic circuit. Therefore, until a magnetic field is generated in the first magnetic or magnetizable component of the fiber preform 240, the first and second portions are not attracted to one another and the fiber preform 240 remains in the open configuration.

In certain aspects, closing the gap 250 may include moving the inductor 266 to a first position adjacent to the fiber preform 240 via the movable arm 268. The first position may be close enough to the electromagnetic circuit of the fiber preform to generate a magnetic field in the electromagnetic circuit. More particularly, in the first position, current is supplied to the inductor 266 to generate a first magnetic field in the inductor 266. The first magnetic field in the inductor 266 generates current in the electromagnetic circuit of the fiber preform 240, which in turn generates a second magnetic field in the fiber preform 240. The second magnetic field attracts the ferromagnetic material of the fiber preform 240 to bring the first and second portions 242, 246 together to move the fiber preform 240 to the closed configuration and form the seam 280.

In various alternative aspects, when the first magnetic or magnetizable component includes a magnetic component, such as a permanent magnet, closing the gap may be performed concurrently with disposing the fiber preform 240 in the bottom mold portion 264. When the first and second portions 242, 246 are in close proximity, the inherent magnetic field from the permanent magnet attracts the ferromagnetic material, thereby closing the gap 250 between the first and second portions 242, 246. The gap 250 may close automatically when the first and second portions 242, 246 of the fiber preform 240 are in close proximity.

In certain aspects, the electromagnetic circuit may emit a residual magnetic field after the inductor 266 stops receiving current or is moved away. The residual magnetic field may facilitate retaining the fiber preform 240 in the closed position until the mold 262 is closed and/or throughout the manufacturing process. In other aspects, the second magnetic or magnetizable component 270 may generate a magnetic field to hold the fiber preform 240 in the closed configuration until the mold 262 is closed and/or throughout the manufacturing process.

Referring to FIG. 7E, the method further includes closing the mold 262. More particularly, the fiber preform 240 in the closed configuration is disposed between the bottom mold portion 264 and a second or top mold portion 284. The method may further include moving the inductor 266 from the first position (FIGS. 7C-7D) to a second position (FIG. 7E) away from the mold 262 via the arm 268. Closing the mold 262 and moving the inductor 266 may be performed concurrently or sequentially, with the mold 262 being closed prior to the inductor 266 being moved or the inductor 266 being moved prior to the mold 262 being closed.

In certain aspects, the method may optionally include determining whether the fiber preform 240 is in the closed configuration. Determining whether the fiber preform 240 is in the closed configuration may include detecting the presence of at least one of the first and second portions 242, 246 at a location of the gap 250 or seam 280. For example, the mold 262 may include an optical sensor having an emitter 286 and a receiver 288. The emitter 286 may be disposed in one of the bottom mold portion 264 or the top mold portion 284. The receiver 288 may be disposed in the other of the bottom mold portion 264 or the top mold portion 284.

Determining whether the fiber preform 240 is in the closed configuration may include emitting a light signal 290 from the emitter 286. Receipt of the light signal 290 by the receiver 288 indicates that the gap 250 has not been closed. Conversely, if the receiver 288 does not receive the light signal 290, then the light signal may be interrupted by the first portion 242 and/or the second portion 246 of the fiber preform 240, indicating that the gap 250 is closed.

With reference to FIG. 7F, the method further includes injecting a polymeric precursor into the mold 262 to form a precursor component 300. The polymer precursor may include any suitable polymer precursor for forming a polymer, for example, for forming a thermoset polymer (e.g., thermoset resin) or a thermoplastic polymer (e.g., a thermoplastic resin). Suitable thermoset polymers may include benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-polymers thereof, and combinations thereof. Suitable thermoplastic polymers may include polyethylenimine (PEI), polyamide-imide (PAI), polyamide (PA) (e.g., nylon 6, nylon 66, nylon 12), caprolactam, polyetheretherketone (PEEK), polyetherketone (PEK), a polyphenylene sulfide (PPS), a thermoplastic polyurethane (TPU), polypropylene (PP), polycarbonate/acrylonitrile butadiene styrene (PC/AB S), high-density polyethylene (HDPE), polyethylene terephthalate (PET), poly(methyl methacrylate) (PMMA), polycarbonate (PC), polyaryletherketone (PAEK), polyetherketoneketone (PEKK), co-polymers thereof, and combinations thereof.

Referring to FIG. 7G, the method includes solidifying (e.g., cooling, reacting, crosslinking) the polymer precursor to form the polymer. After cooling, a composite component 310 including the polymer and the fiber preform 240 (FIGS. 7A-7E) is formed.

With reference to FIG. 7H, the composite component 310 is removed from the mold 262 (FIG. 3G). The composite component 310 may have a complex three-dimensional geometry that is substantially free of resin-rich regions, wrinkles, and external seams. Accordingly, the composite component 310 may have a high strength.

In various aspects, the composite component 310 is a component for a vehicle, such as an automobile. The component may include a pillar, a structural panel, a suspension component, a crush can, a bumper beam, a structural front rail, a structural frame, a cross car beam, an undercarriage component, and combinations thereof, by way of example. In additional to automotive applications, the composite component 310 may also be used in other applications, such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like. The composite component 310 and method of manufacturing may also have applicability in non-vehicle applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a composite component, the method comprising:
   disposing a fiber preform in a mold, the fiber preform comprising a first portion including a first edge and a second portion including a second edge, the first edge and the second edge cooperating to at least partially define a gap in the fiber preform between the first portion and the second portion, one of the first portion or the second portion of the fiber preform comprising a first ferromagnetic material and the other of the first portion or the second portion of the fiber preform comprising a first magnetic or magnetizable component;
   closing the gap in the fiber preform by generating a magnetic field from the first magnetic or magnetizable component of the fiber preform;
   injecting a polymer precursor into the mold; and forming the composite component by solidifying the polymer precursor to form a polymer, the composite component comprising the fiber preform and the polymer.

2. The method of claim 1, wherein the first magnetic or magnetizable component comprises an electromagnetic circuit comprising an electrically-conductive coil at least partially defining an interior region and a core disposed at least partially within the interior region, the core comprising a second ferromagnetic material.

3. The method of claim 2, wherein the closing comprises supplying current to an inductor to generate a magnetic field from the electromagnetic circuit.

4. The method of claim 3, wherein the inductor is coupled to a movable arm.

5. The method of claim 4, further comprising:
moving the movable arm to a first position prior to the closing; and
moving the movable arm to a second position distinct from the first position after the closing, wherein the movable arm is in the first position during the closing.

6. The method of claim 1, wherein the first magnetic or magnetizable component comprises a permanent magnet.

7. The method of claim 1, wherein the first ferromagnetic material comprises iron, nickel, cobalt, or any combination thereof.

8. The method of claim 1, wherein the mold comprises a second magnetic or magnetizable component.

9. The method of claim 8, further comprising, prior to the closing, aligning the fiber preform in the mold by generating a magnetic field from the second magnetic or magnetizable component.

10. The method of claim 8, further comprising, after the closing, maintaining the gap in a closed position by generating a magnetic field from the second magnetic or magnetizable component.

11. The method of claim 1, wherein the first ferromagnetic material is substantially continuous along a first length of the first edge and the first magnetic or magnetizable component is substantially continuous along a second length of the second edge.

12. The method of claim 1, wherein the first edge and the second edge are non-linear and define complementary shapes.

13. The method of claim 1, wherein the first ferromagnetic material is disposed in a first plurality of regions in the first portion and the first magnetic or magnetizable component is disposed in a second plurality of regions in the second portion, the first plurality of regions being configured to be aligned with the second plurality of regions, respectively, after the closing.

14. The method of claim 1, wherein the closing comprises forming a lap joint between the first edge and the second edge.

15. The method of claim 1, wherein a maximum dimension of the gap is greater than or equal to about 1 mm to less than or equal to about 10 mm.

16. The method of claim 1, further comprising, prior to the injecting, determining whether the gap is closed.

17. The method of claim 16, wherein the determining comprises detecting a presence of at least one of the first portion of the fiber preform and the second portion of the fiber preform with an optical sensor.

18. The method of claim 1, wherein the fiber preform comprises a first fiber preform including the first portion and a distinct second fiber preform including the second portion.

19. A method of manufacturing a composite component, the method comprising:
disposing a fiber preform in a mold, the fiber preform comprising a first portion including a first edge and a second portion including a second edge, the first edge and the second edge cooperating to at least partially define a gap in the fiber preform between the first portion and the second portion, one of the first portion or the second portion of the fiber preform comprising a first ferromagnetic material and the other of the first portion or the second portion of the fiber preform comprising a first magnetic or magnetizable component, and the mold comprising a second magnetic or magnetizable component;
aligning the fiber preform in the mold by generating a magnetic field from the second magnetic or magnetizable component;
after the aligning, closing the gap in the fiber preform by generating a magnetic field from the first magnetic or magnetizable component of the fiber preform;
after the closing, maintaining the gap in a closed position by generating a magnetic field from the second magnetic or magnetizable component;
determining whether the gap is closed;
after the determining, injecting a polymer precursor into the mold; and
forming the composite component by solidifying the polymer precursor to form a polymer, the composite component comprising the fiber preform and the polymer.

* * * * *